(12) United States Patent
Segura

(10) Patent No.: US 7,997,056 B2
(45) Date of Patent: Aug. 16, 2011

(54) SHACKLE APPARATUS

(75) Inventor: Victor J. Segura, New Iberia, LA (US)

(73) Assignee: Useful Products, L.L.C., New Iberia, LA (US)

( * ) Notice: Subject to any disclaimer, the term of this patent is extended or adjusted under 35 U.S.C. 154(b) by 0 days.

(21) Appl. No.: 12/952,445

(22) Filed: Nov. 23, 2010

(65) Prior Publication Data

US 2011/0175384 A1 Jul. 21, 2011

Related U.S. Application Data

(63) Continuation of application No. 12/802,901, filed on Jun. 16, 2010.

(60) Provisional application No. 61/296,958, filed on Jan. 21, 2010.

(51) Int. Cl.
F16G 15/06 (2006.01)
B66C 1/34 (2006.01)

(52) U.S. Cl. .................................. 59/86; 59/78; 59/85

(58) Field of Classification Search ............... 59/78, 82, 59/85, 86
See application file for complete search history.

(56) References Cited

U.S. PATENT DOCUMENTS

| 285,962 | A | * | 10/1883 | Bracken | 278/96 |
|---|---|---|---|---|---|
| 962,733 | A | * | 6/1910 | Beltz | 278/96 |
| 1,222,997 | A | * | 4/1917 | Rottmer | 59/86 |
| 1,273,689 | A | * | 7/1918 | Thomas | 278/96 |
| 1,751,309 | A | * | 3/1930 | De Mone | 24/115 R |
| 3,962,811 | A | * | 6/1976 | Buschini et al. | 43/8 |
| 4,134,255 | A | * | 1/1979 | McBain et al. | 59/78 |
| 4,221,252 | A | * | 9/1980 | Bruce | 411/317 |
| 4,249,474 | A | | 2/1981 | Archer | |
| 4,565,399 | A | | 1/1986 | Cranston | |
| 5,103,755 | A | | 4/1992 | Garrett | |
| 5,429,007 | A | | 7/1995 | Khachaturian et al. | |
| 5,452,679 | A | | 9/1995 | Eckley | |
| 5,466,082 | A | | 11/1995 | Sherar | |
| 5,589,646 | A | | 12/1996 | Khachaturian et al. | |
| 5,975,786 | A | | 11/1999 | Chang | |
| 6,282,879 | B1 | * | 9/2001 | Bonaiti et al. | 59/86 |
| 6,774,320 | B2 | | 8/2004 | Simons | |
| 7,614,209 | B1 | * | 11/2009 | Payne et al. | 59/86 |

OTHER PUBLICATIONS

Halyard Shackle—http://www.bosunsupplies.com/products2cfm?product=S0164, Jun. 11, 2001.
Seafit RFID Shackle—http://www.offshore-mag.com/index/article-display/3125382309/articles/offshore/volume-70/Issue_6/equipment-_engineering/Heavy_lift_shackle_design_offers_new_benefits.html, Jun. 1, 2010.
Wichard Shackle—http://www.yachtmailchandlery.com/wichard-stainless-key-pin-shackles-p-403.html, Oct. 20, 2010.
New Zealand Scaffolding Best Practices—http://www.osh.dol.govt.nz/publications/booklets/scaffolding-09/scaffolding_08.asp, Oct. 20, 2010.
A. Noble & Son Shackle—http://nobles.com/au/products.aspx?doc_id=1264, Oct. 20, 2010.
Seafit RFID Shackle—http://www.sea-fit.com/featured/1277850327.pdf, Oct. 20, 2010.

* cited by examiner

Primary Examiner — David B Jones
(74) Attorney, Agent, or Firm — Russel O. Primeaux; Pamela A. Baxter; Kean Miller LLP

(57) ABSTRACT

A shackle apparatus including a generally U-shaped shackle body having an arcuate end, a pair of parallel arms, and a retaining member spanning a gap defined between the shackle arms. The retaining member cooperates with the shackle body to define a closed loop which can be permanently attached to a sling or lifting cable. The retaining member prevents the shackle apparatus from being removed and installed on another sling or lifting cable without substantially destroying the shackle apparatus of the present invention.

18 Claims, 3 Drawing Sheets

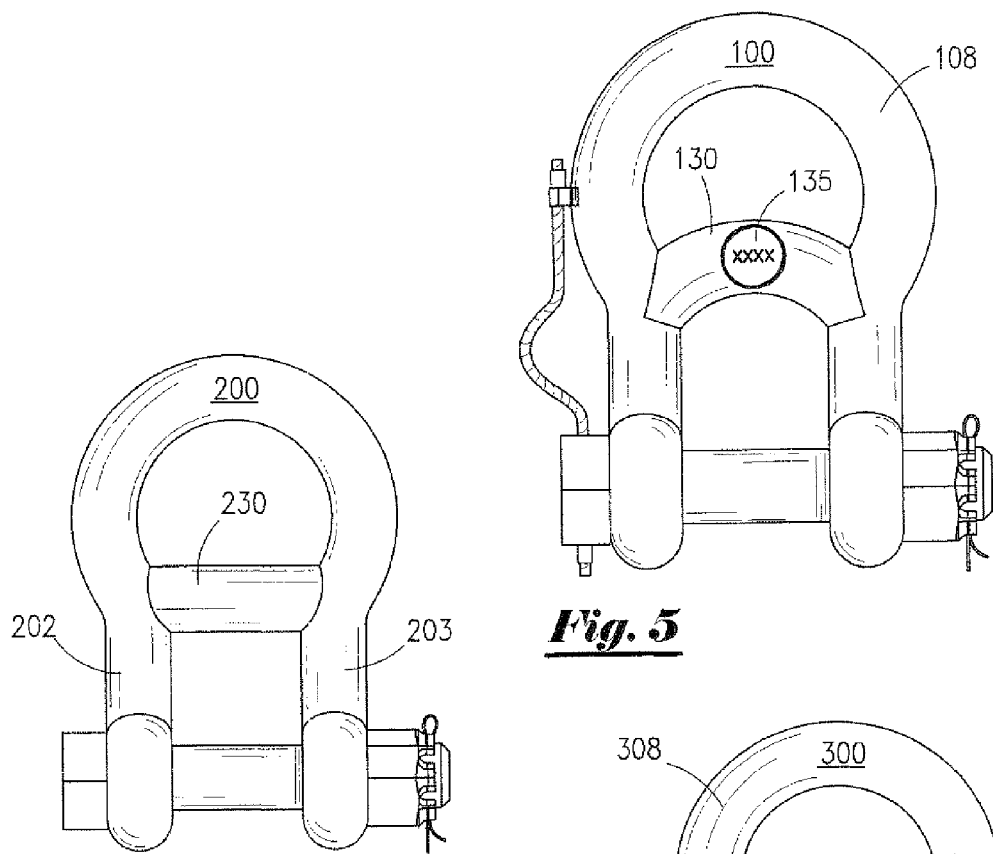
*Fig. 5*
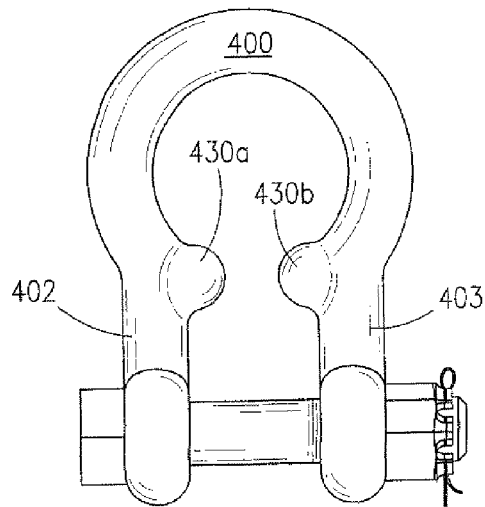
*Fig. 6*
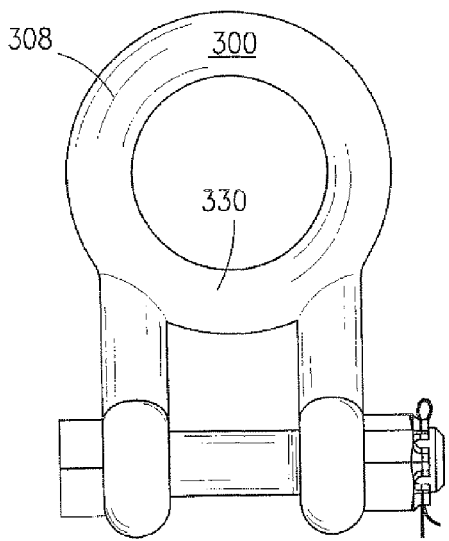
*Fig. 7*
*Fig. 8*

SHACKLE APPARATUS

CROSS REFERENCES TO RELATED APPLICATION

Priority of U.S. non-provisional application Ser. No. 12/802,901, filed Jun. 16, 2010, and Provisional Patent Application Ser. No. 61/296,958 filed Jan. 21, 2010, incorporated herein by reference, is hereby claimed.

STATEMENTS AS TO THE RIGHTS TO THE INVENTION MADE UNDER FEDERALLY SPONSORED RESEARCH AND DEVELOPMENT

None

BACKGROUND OF THE INVENTION

1. Field of the Invention

The present invention relates generally to an assembly for connecting a sling, cable, or other lifting device to a load to be lifted. More particularly, the present invention relates to a shackle apparatus that is permanently attached to a set of slings, lifting cables or the like. More particularly still, the present invention relates to a captivated shackle apparatus that must also be discarded when attached slings or lifting cables are discarded.

2. Brief Description of the Prior Art

Numerous devices have been devised for the purpose of lifting baskets, skids and/or similar equipment, especially in connection with the transportation of said baskets, skids and/or equipment from one location (such as, for example, the deck of a boat) to another location (such as, for example, an offshore platform) using a crane, hoist or other lifting means. In the course of such lifting operations, consideration must be given to maintaining control of a load during the lifting process. Consideration must also be given to other factors, such as ease in making connections and disconnections to such load, as well as the protection or preservation of the load being transported. Perhaps more significantly, consideration must also be given to minimizing possible failure locations on the item(s) being lifted, as well as the related lift equipment, in order to prevent damage to property or personnel.

During lifting operations, large or heavy loads are typically lifted using a set of slings connected to the line of a crane, hoist or other lifting apparatus. Although it is often possible to connect a crane or hoist line directly to a load to be lifted using shackles or the like, slings generally provide an intermediate means to quickly and efficiently connect a lifting device to a load. Further, because many slings utilize two or more separate lines connected to a central link or loop, slings are generally preferred because they allow for more even weight distribution during the lifting process.

The use of slings to lift and/or transport equipment, cargo or other loads is very common in offshore or marine operations, as well as numerous other applications, such as the loading and unloading of ships and other vessels. It should be noted that the offshore oil and gas industry, although representative of the issues faced in the lifting and transportation of heavy loads, is but one application involving such issues.

The use of lifting slings or cables as an intermediary link for connecting a load to a lifting device (such as a crane hook or the like) is well known. In conventional lifting applications, a lifting sling normally has a plurality of cable legs of substantially equal length, which are joined together at their upper ends and are coupled to a common, master connection assembly. In most instances, said master connection assembly is a loop dimensioned so that it can easily connect to a crane hook. Each cable leg of the sling is normally fitted with a looped terminal end which is formed using a mechanical joint or crimped band.

In many instances, shackles or other means can be used to connect the individual lines of a set of slings to pad-eyes of a load to be lifted. Specifically, a shackle or clevis is commonly used to connect each looped end of a sling or lifting cable to a load to be lifted. In conventional lifting applications utilizing existing shackle assemblies, a substantially U-shaped shackle having a mouth or opening is passed through the loop or eye of a sling or lifting cable. Thereafter, a bolt is threaded through aligned bores in said shackle and an opening in a lift lug or pad eye of a load to be lifted. In this manner, the shackle provides a quick and efficient means for affixing a sling, cable, or other lifting device to a load to be lifted.

Safety regulations and customary safety procedures often dictate that lifting slings or cables be discarded after a predetermined threshold is met, such as a certain period of time or number of lifts. Despite such safety regulations and/or procedures, it has been observed that shackles are often removed from such lifting slings or cables prior to discarding of the slings or cables. The removal of shackles from such slings and re-use of such shackles on other slings or lifting cables defeats the purpose of the aforementioned safety practices. As such, it would be beneficial to provide a captivated shackle apparatus permanently attached to a set of lifting slings or cables that must be discarded along with such attached slings or lifting cables in order to ensure that such shackles are not re-installed or re-used on other slings or lifting cables.

SUMMARY OF THE PRESENT INVENTION

The present invention comprises a shackle apparatus having a generally U-shaped shackle body having an arcuate end, a pair of substantially parallel arms, and a retaining member disposed between said shackle arms. Each arm has a lower end with a transverse bore for receiving a bolt or other rigid member, the lower ends being substantially parallel such that the transverse bores are in general axial alignment.

The shackle apparatus of the present invention is intended to be permanently attached to a sling of a lifting cable such that the retaining member prevents such shackle apparatus from being removed and installed on another sling or lifting cable without substantially damaging or destroying the shackle apparatus of the present invention, thereby rendering it effectively useless.

The shackle apparatus of the present invention can be affixed to a load to be lifted by passing a bolt or other rigid member through aligned bores in the shackle arms and through a complimentary hole in a pad eye or lift lug on the load to be lifted. In the preferred embodiment, said bolt includes an externally threaded portion and can be secured in place using a threaded-nut or other similar device.

It is an object of the invention to provide a captivated shackle apparatus that is permanently attached to a lifting sling or cable.

It is a more particular object of the present invention to provide a shackle apparatus which cannot be removed from one lifting sling or cable and installed on another lifting sling or cable without substantially destroying the shackle apparatus of the present invention and rendering it useless.

It is a further object of the present invention to provide a shackle apparatus that must be discarded along with a lifting sling or cable after a predetermined threshold is satisfied such as, for example, length of time or number of lifts.

BRIEF DESCRIPTION OF THE DRAWINGS

The foregoing summary, as well as the following detailed description of the preferred embodiments, is better understood when read in conjunction with the appended drawings. For the purpose of illustrating the invention, the drawings show certain preferred embodiments. It is understood, however, that the invention is not limited to the specific methods and devices disclosed.

FIG. 5 depicts a front view of the shackle apparatus of the present invention.

FIG. 6 depicts a front view of a first alternative embodiment of the shackle apparatus of the present invention.

FIG. 7 depicts a front view of a second alternative embodiment of the shackle apparatus of the present invention.

FIG. 8 depicts a front view of a third alternative embodiment of the shackle apparatus of the present invention.

DETAILED DESCRIPTION OF A PREFERRED EMBODIMENT OF THE INVENTION

Figures 1, 2:
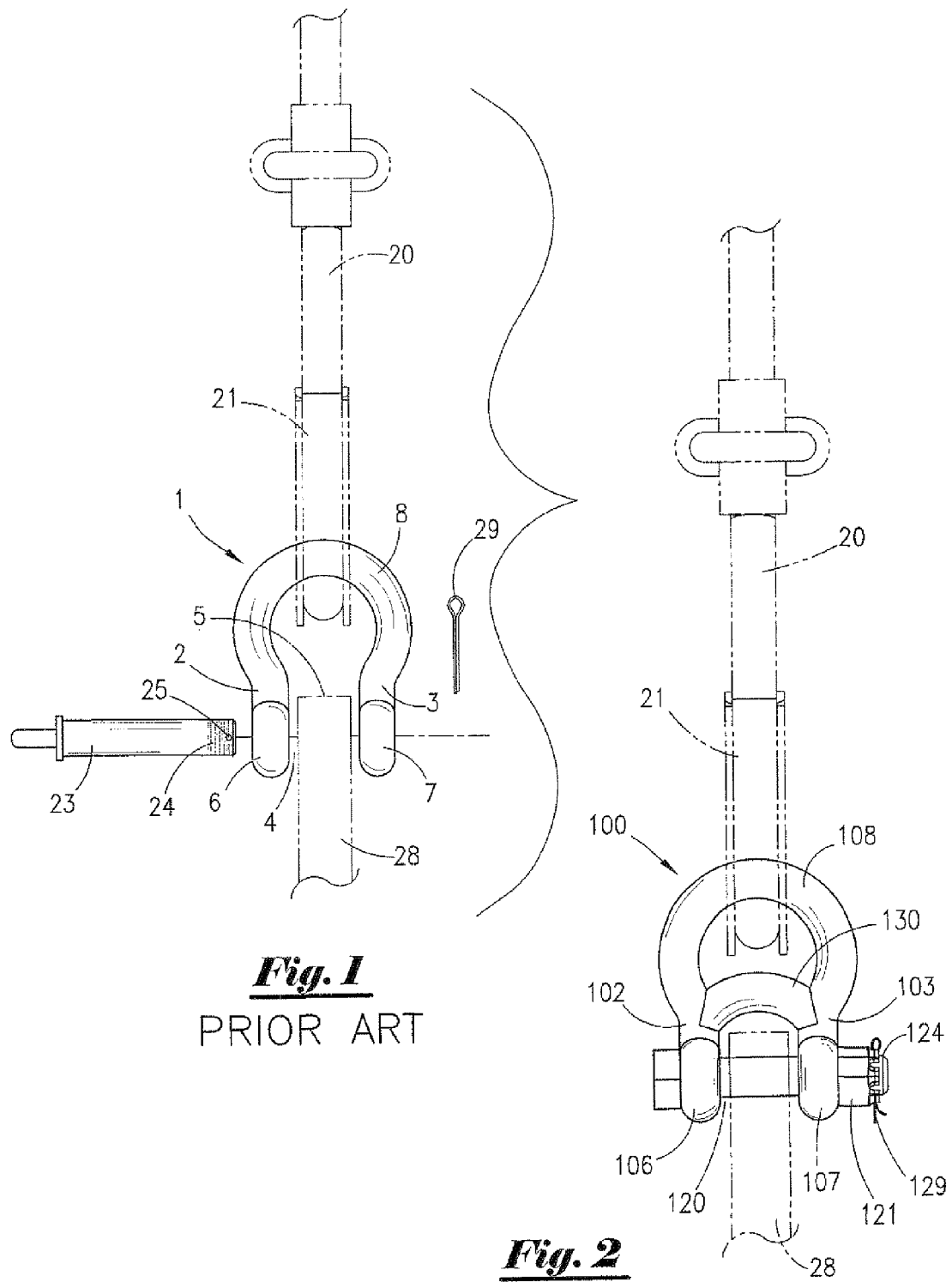
FIG. 1 depicts a partially exploded front view of a prior art shackle apparatus.
FIG. 2 depicts a front view of an embodiment the shackle apparatus of the present invention installed on a sling loop.

Referring now to the drawings, FIG. 1 depicts a partially-exploded front view of an embodiment of a conventional lifting assembly utilizing a prior art shackle member 1 having a curved, substantially U-shaped body section 8, first arm 2 and second arm 3. A throat or gap 5 is defined between said first arm 2 and second arm 3, and a mouth or opening 4 leads to said throat 5. Arms 2 and 3 of prior art shackle 1 also include substantially parallel ends 6 and 7 respectively. Substantially parallel ends 6 and 7 include aligned coaxial transverse bores 6a and 7a (not visible in FIG. 1), respectively, for receiving a bolt 23 or other rigid member.

In the conventional lifting assembly depicted in FIG. 1, mouth 4 of prior art shackle 1 is first passed through loop 21 of a sling or lifting cable 20. Coaxial transverse bores 6a and 7a of prior art shackle 1 are aligned with an opening (not visible in FIG. 1) in a lift lug or pad eye 28 of a load to be lifted. Bolt 23 is thereafter inserted through aligned coaxial bores 6a and 7a, as well as said opening (not visible in FIG. 1) in the lift lug 28 of the load to be lifted. In the embodiment depicted in FIG. 1, bolt 23 can be rotated so that external threads 24 present on said bolt 23 can engage with internal threads in transverse bore 7a extending through end 7 of arm 3. Thereafter, cotter pin 29 can be introduced through cotter pin hole 25 in bolt 23 and secured in place to prevent said bolt 23 from traveling axially with respect to aligned bores 6a and 7a (not visible in FIG. 1).

FIG. 2 depicts a front view of shackle apparatus 100 according to a preferred embodiment of the present invention. Shackle apparatus 100 has a substantially U-shaped shackle body section 108, and substantially parallel first arm 102 and second arm 103. A throat or gap is defined by the space between said first arm 102 and second arm 103. Retaining member 130 is disposed between said shackle arms 102 and 103. In the preferred embodiment, retaining member 130 is a rigid, integrated cross member disposed between first and second arms 102 and 103, such that retaining member 130 spans the throat or gap between said first and second arms. Retaining member 130 cooperates with shackle body 108 to effectively form a closed loop. In the preferred embodiment, said closed loop formed by cooperating elements shackle body 108 and retaining member 130 is permanently affixed to loop 21 of a sling or lifting cable 20.

In the preferred embodiment, first shackle arm 102 has lower end 106, while second shackle arm 103 has lower end 107. Shackle arms 102 and 103 are substantially parallel and are provided with aligned transverse bores 102a and 103a (not shown in FIG. 2), respectively, for axially receiving a bolt 120 or other rigid member. Specifically, bolt 120 is passed through aligned coaxial bores in arms 102 and 103 of shackle 100 (as well as an opening in lift lug 28) to affix shackle apparatus 100 to a load to be lifted. Bolt 120 preferably includes an externally threaded portion 124 and cotter pin hole 125 (not shown in FIG. 2) through which cotter pin 129 can be inserted and secured after a threaded fitting, such as a castle nut 121, is installed on externally threaded portion 124 of bolt 120.

Figure 4:
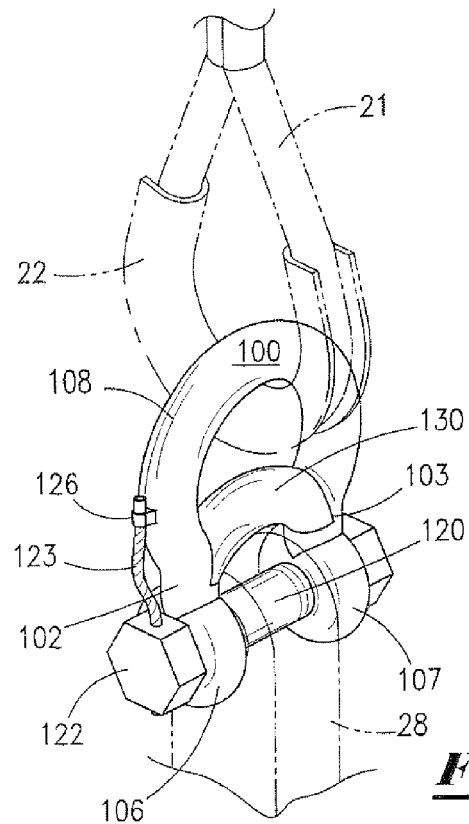
FIG. 4 depicts a front perspective view of the shackle apparatus of the present invention installed on a sling loop.

FIG. 4 depicts a front perspective view of shackle apparatus 100 of the present invention installed on sling loop 21 having reinforcing sleeve 22. Shackle apparatus 100 has a substantially U-shaped shackle body 108, first arm 102 and second arm 103 defining a gap between said first arm 102 and second arm 103.

Retaining member 130 is disposed between shackle arms 102 and 103. In the preferred embodiment, retaining member 130 is a rigid, integrated cross member disposed between the upper ends of first and second arms 102 and 103, respectively, such that retaining member 130 spans the space formed between said first and second arms 102 and 103 of shackle 100. Substantially U-shaped shackle body 108 and retaining member 130 cooperate to define a substantially closed loop that can be permanently affixed to loop 21 of a sling or lifting cable 20.

In the preferred embodiment, lower end 106 of shackle arm 102, and lower end 107 of shackle arm 103, are substantially parallel and are provided with aligned transverse bores (not shown in FIG. 4) for axially receiving a bolt 120 or other rigid member. Bolt 120 is passed through said aligned coaxial bores in lower end 106 of first arm 102, and lower end 107 of second arm 103 (as well as an aligned opening in lift lug 28) to affix shackle apparatus 100 to a load to be lifted. In the preferred embodiment, retaining cable 123 is provided. Said retaining cable is affixed at one end to head 122 of bolt 120, and at the other end to shackle body 108 using bracket 126. Retaining cable 123 beneficially prevents bolt 120 from being removed from shackle apparatus 100 and subsequently re-used on another shackle with severing retaining cable 123.

Figure 3:
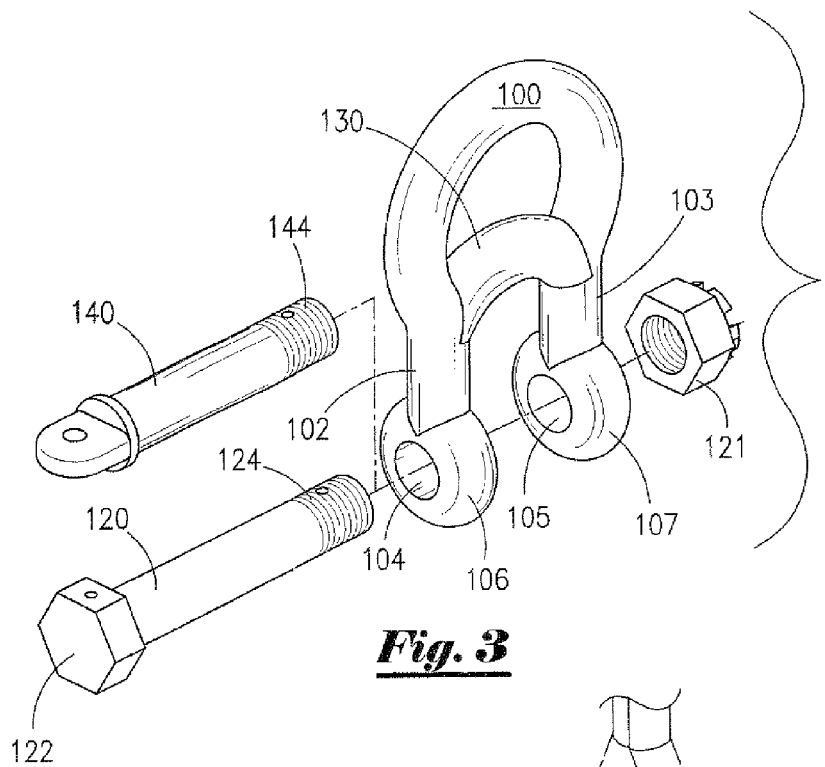
FIG. 3 depicts partially exploded perspective view of the shackle apparatus of the present invention.

FIG. 3 depicts an exploded perspective view of shackle apparatus 100 of the present invention having a substantially U-shaped shackle body 108, first arm 102 and second arm 103. A gap is defined between said first arm 102 and second arm 103. Retaining member 130 is disposed between shackle arms 102 and 103 and spans said gap between said arms.

In the preferred embodiment, retaining member 130 is a rigid, integrated, cross member disposed between first and second arms 102 and 103, respectively, such that retaining member 130 spans the gap formed between arms 102 and 103.

In the preferred embodiment, lower end 106 of shackle arm 102, and lower end 107 of shackle arm 103, are substantially parallel. Transverse bore 104 extends through said lower end 106 of shackle arm 102, while transverse bore 105 extends through lower end 107 of shackle arm 103. Transverse bores 104 and 105 are substantially aligned with one another.

Bolt 120 having head 122 and external threaded portion 124 is inserted through transverse bore 104, an aligned hole in a lifting lug or pad-eye of a load to be lifted (such as, for example, lift lug 28 depicted in FIG. 4), and transverse bore 105. Thereafter, castle nut 121 can be installed on, and threadably engaged with, threaded portion 124 of bolt 120 in order to secure said bolt 120 in place. Alternative bolt embodiment 140 is also depicted in FIG. 3. Alternative bolt embodiment 140 has external threaded portion 144, which can mate with optional threads disposed on the internal surface of transverse bore 107.

Shackle apparatus 100 depicted in FIG. 5 includes a curved retaining member 130 bowing in substantial alignment with the generally arcuate shape of shackle body 108. FIG. 6 depicts an alternative embodiment of shackle apparatus 200 having a substantially straight retaining member 230 disposed in substantially perpendicular orientation to shackle arms 202 and 203. The alternative embodiment of shackle apparatus 300 depicted in FIG. 7 includes a curved retaining member 330 that cooperates with substantially arcuate body section 308 to form a generally circular closed loop. In the alternative embodiment of shackle 400 depicted in FIG. 8, retaining member 430 comprises a pair of projections 430a and 430b. The reduced gap between retaining member projections 430a and 430b is less than the cross-sectional distance (thickness) of a sling loop (such as sling loop 21 depicted in FIG. 4, for example), such that said sling loop cannot pass through the space formed between arms 402 and 403.

In the preferred embodiment, shackle apparatus 100 and bolt 120 of the present invention are beneficially constructed of unitary pieces preferably produced by forging using a durable material and can be strengthened using conventional heat treating processes. In the preferred embodiment, the forged shackle apparatus 100 is permanently attached to the looped end of a sling or lifting cable 20.

Still referring to FIG. 5, apparatus 100 of the present invention can be permanently attached to a sling or lifting cable such that cooperation between the shackle body and retaining member 130 prevents shackle apparatus 100 from being removed and installed on another sling or lifting cable without substantially damaging or destroying shackle apparatus 100 of the present invention.

In the preferred embodiment, shackle apparatus 100 of the present invention may be beneficially provided with a radio frequency identification (RFID) chip or tag. A RFID tag incorporated into shackle apparatus 100 enables a user to monitor the conditions of a shackle apparatus 100 including, but not limited to, the identity, location and history of operation and use. Moreover, shackle apparatus 100 of the present invention may be beneficially provided with identifying indicia on the surface of the shackle body 108 or retaining member 130. Such identifying indicia may comprise much different information, but in the preferred embodiment would reflect significant information regarding the shackle apparatus including, without limitation, manufacturer, date of manufacture, owner, load rating/specifications and/or useable life.

Although a RFID can be incorporated into shackle apparatus 100 in many different ways, in the preferred embodiment depicted in FIG. 5, recess 135 is disposed on retaining member 130. A RFID chip can be installed in said recess 135, and secured in place using an adhesive, resin, epoxy or other material having desired properties.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A shackle apparatus comprising:
    a. an arcuate body;
    b. a first arm connected to said arcuate body, said first arm having a transverse bore extending therethrough;
    c. a second arm connected to said arcuate body, said second arm having a transverse bore extending therethrough, wherein said first and second arms are substantially parallel to each other, and said transverse bores are in axial alignment;
    d. a retaining member disposed between said first and second arms, said retaining member integrally formed with said first arm and said second arm; and
    e. a rigid member received within said aligned transverse bores, said rigid member comprising a bolt having a first end and a second end, a head disposed at said first end and threads at said second end; and
    wherein a nut is threadably connected to the threads of said bolt.

2. The shackle apparatus of claim 1, said shackle apparatus further comprising a cable having a first end and a second end, wherein said first end is connected to the head of said bolt, and said second end is connected to said arcuate body.

3. The shackle apparatus of claim 1, wherein said retaining member comprises a substantially straight member.

4. The shackle apparatus of claim 1, wherein said retaining member comprises an arcuate member, and said arcuate body and retaining member together define a substantially circular loop.

5. The shackle apparatus of claim 1, further comprising an RFID chip.

6. The shackle apparatus of claim 5, further comprising:
    a. a recess in said retaining member for receiving said RFID chip; and
    b. an adhesive for securing said RFID chip within said recess.

7. The shackle apparatus of claim 1, further comprising indicia disposed on said arcuate body or retaining member.

8. The shackle apparatus of claim 1, wherein said shackle apparatus further comprises a cable forming a sling, wherein a loop of said cable is disposed between said arcuate body and said retaining member.

9. A shackle apparatus comprising:
    a. an arcuate body;
    b. a first arm connected to said arcuate body, said first arm having a transverse bore extending therethrough;
    c. a second arm connected to said arcuate body, said second arm having a transverse bore extending therethrough, wherein said first and second arms are substantially parallel to each other, and said transverse bores are in axial alignment;
    d. a retaining member disposed between said first and second arms, said retaining member integrally formed with said first arm and said second arm;
    e. a rigid member received within said aligned transverse bores; and f. a cable forming a sling, wherein a loop of said cable is disposed between said arcuate body and said retaining member;

wherein said retaining member further comprises a first projection on said first arm extending toward said second arm and a second projection on said second arm extending toward said first arm; and wherein the distance between said first and second projections is less than the diameter of said cable forming said sling.

10. A shackle apparatus comprising:
   a. an arcuate body;
   b. a first arm connected to said arcuate body, said first arm having a transverse bore extending therethrough;
   c. a second arm connected to said arcuate body, said second arm having a transverse bore extending therethrough, wherein said first and second arms are substantially parallel to each other, and said transverse bores are in axial alignment;
   d. a retaining member disposed between said first and second arms, said retaining member integrally formed with said first and said second arm;
   e. a bolt received within said aligned transverse bores, said bolt having a first end and a second end, a head disposed at said first end and threads at said second end;
   f. a castle nut threadably connected to the threads of said bolt; and
   g. a cable having a first end and a second end, wherein said first end is connected to the head of said bolt, and said second end is connected to said arcuate body.

11. The shackle apparatus of claim 10, wherein a loop of a cable sling is disposed between said arcuate body and said retaining member.

12. The shackle apparatus of claim 10, wherein said retaining member comprises a substantially straight member.

13. The shackle apparatus of claim 10, wherein said retaining member comprises an arcuate member, and said arcuate body and retaining member together define a substantially circular loop.

14. The shackle apparatus of claim 11, where said retaining member further comprises:
   a. a first projection on said first arm extending toward said second arm; and
   b. a second projection on said second arm extending toward said first arm;
   wherein the distance between said first and second projections is less than the diameter of the cable forming said sling.

15. The shackle apparatus of claim 10, further comprising an RFID chip.

16. The shackle apparatus of claim 15, further comprising a recess in said retaining member for receiving said RFID chip.

17. The shackle apparatus of claim 16, wherein said RFID chip is secured within said recess using an adhesive, epoxy or resin.

18. The shackle apparatus of claim 10, further comprising indicia disposed on said arcuate body or retaining member.

* * * * *